US012671465B2

(12) United States Patent
Zhu

(10) Patent No.: US 12,671,465 B2
(45) Date of Patent: Jun. 30, 2026

(54) FREQUENCY OFFSET COMPENSATION AND CALIBRATION METHOD AND APPARATUS, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 624 days.

(21) Appl. No.: 18/005,913

(22) PCT Filed: Aug. 5, 2020

(86) PCT No.: PCT/CN2020/107150
§ 371 (c)(1),
(2) Date: Jan. 18, 2023

(87) PCT Pub. No.: WO2022/027329
PCT Pub. Date: Feb. 10, 2022

(65) Prior Publication Data
US 2023/0268959 A1 Aug. 24, 2023

(51) Int. Cl.
*H04B 7/01* (2006.01)
*H04B 7/185* (2006.01)
(52) U.S. Cl.
CPC .......... *H04B 7/01* (2013.01); *H04B 7/18513* (2013.01)
(58) Field of Classification Search
CPC .. H04B 7/01; H04B 7/18513; H04B 7/18519; H04B 7/18532; H04B 7/18589; H04B 7/26
See application file for complete search history.

(56) References Cited

U.S. PATENT DOCUMENTS

| | | | | | |
|---|---|---|---|---|---|
| 5,898,903 | A * | 4/1999 | Hu | ........................... | H04B 7/01 |
| | | | | | 455/75 |
| 7,873,336 | B2 * | 1/2011 | Fei | ....................... | H04L 27/2657 |
| | | | | | 455/283 |
| 8,643,542 | B2 * | 2/2014 | Wendel | ................... | G01S 19/29 |
| | | | | | 342/357.62 |
| 8,798,210 | B2 * | 8/2014 | Zhang | ................ | H04L 27/2675 |
| | | | | | 714/792 |
| 10,439,706 | B2 * | 10/2019 | Michaels | ............. | H04B 7/2041 |
| 10,673,664 | B1 * | 6/2020 | Yu | .......................... | H04L 27/227 |
| 10,911,211 | B1 * | 2/2021 | Kratz | .................... | H04J 3/0664 |

FOREIGN PATENT DOCUMENTS

CN          109005135 A    12/2018

OTHER PUBLICATIONS

International Search Report and Written Opinion of International Application No. PCT/CN2020/107150, mailed Apr. 22, 2021, 17 pages.

* cited by examiner

*Primary Examiner* — Ayman A Abaza
(74) *Attorney, Agent, or Firm* — Finnegan, Henderson, Farabow, Garrett & Dunner, L.L.P.

(57) ABSTRACT

A method for compensating for and calibrating a frequency offset is performed by a terminal, and includes: compensating or precompensating a target frequency according to a downlink frequency offset; obtaining an uplink residual frequency offset sent by a network device, the uplink residual frequency offset corresponding to an uplink signal sent by the terminal; and calibrating a compensation frequency or a precompensation frequency for the target frequency according to the uplink residual frequency offset.

19 Claims, 7 Drawing Sheets

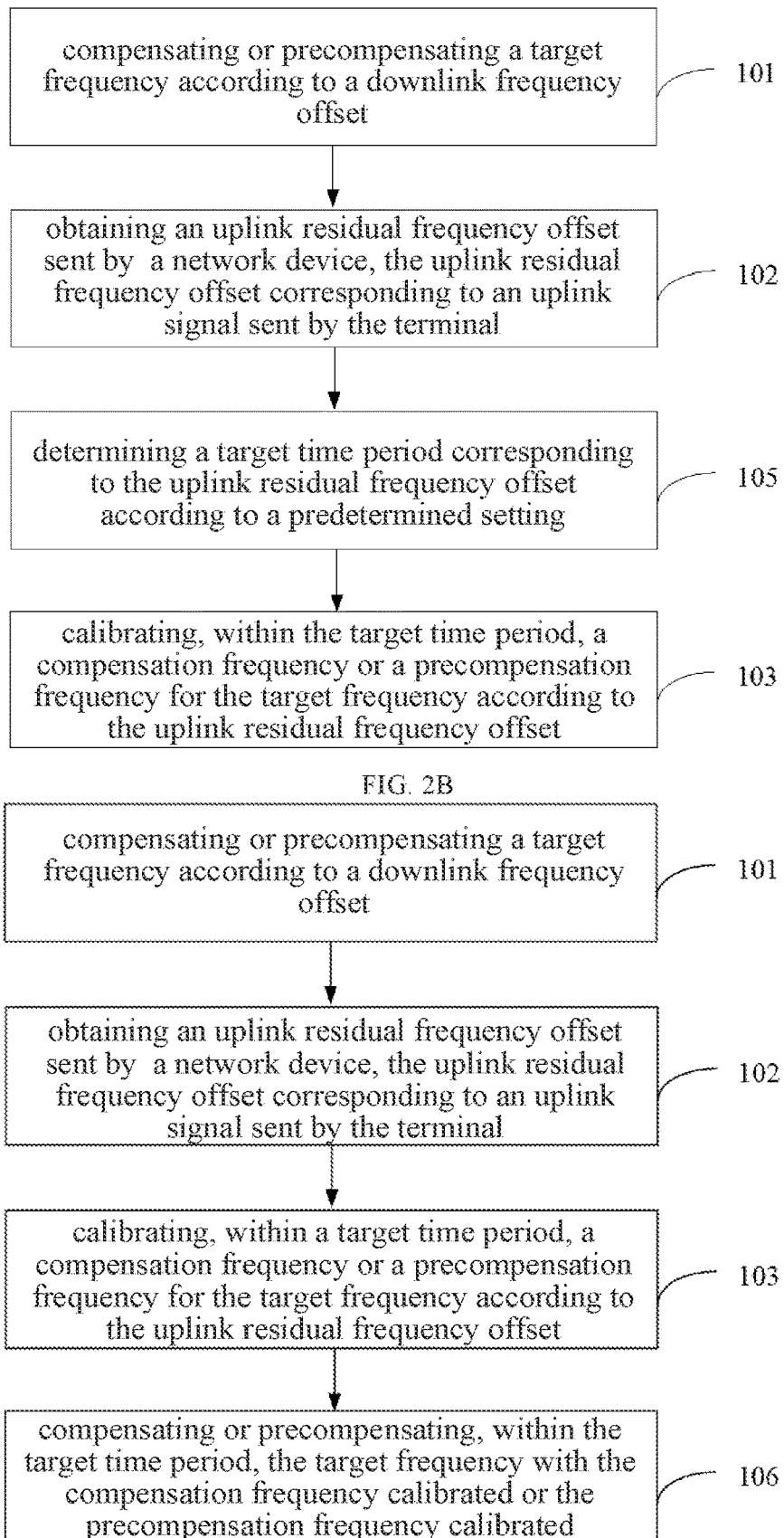

compensating or precompensating a target frequency according to a downlink frequency offset — 101 obtaining an uplink residual frequency offset sent by a network device, the uplink residual frequency offset corresponding to an uplink signal sent by the terminal — 102 determining a target time period corresponding to the uplink residual frequency offset according to a predetermined setting — 105 calibrating, within the target time period, a compensation frequency or a precompensation frequency for the target frequency according to the uplink residual frequency offset — 103

FIG. 2B compensating or precompensating a target frequency according to a downlink frequency offset — 101 obtaining an uplink residual frequency offset sent by a network device, the uplink residual frequency offset corresponding to an uplink signal sent by the terminal — 102 calibrating, within a target time period, a compensation frequency or a precompensation frequency for the target frequency according to the uplink residual frequency offset — 103 compensating or precompensating, within the target time period, the target frequency with the compensation frequency calibrated or the precompensation frequency calibrated — 106

FIG. 3

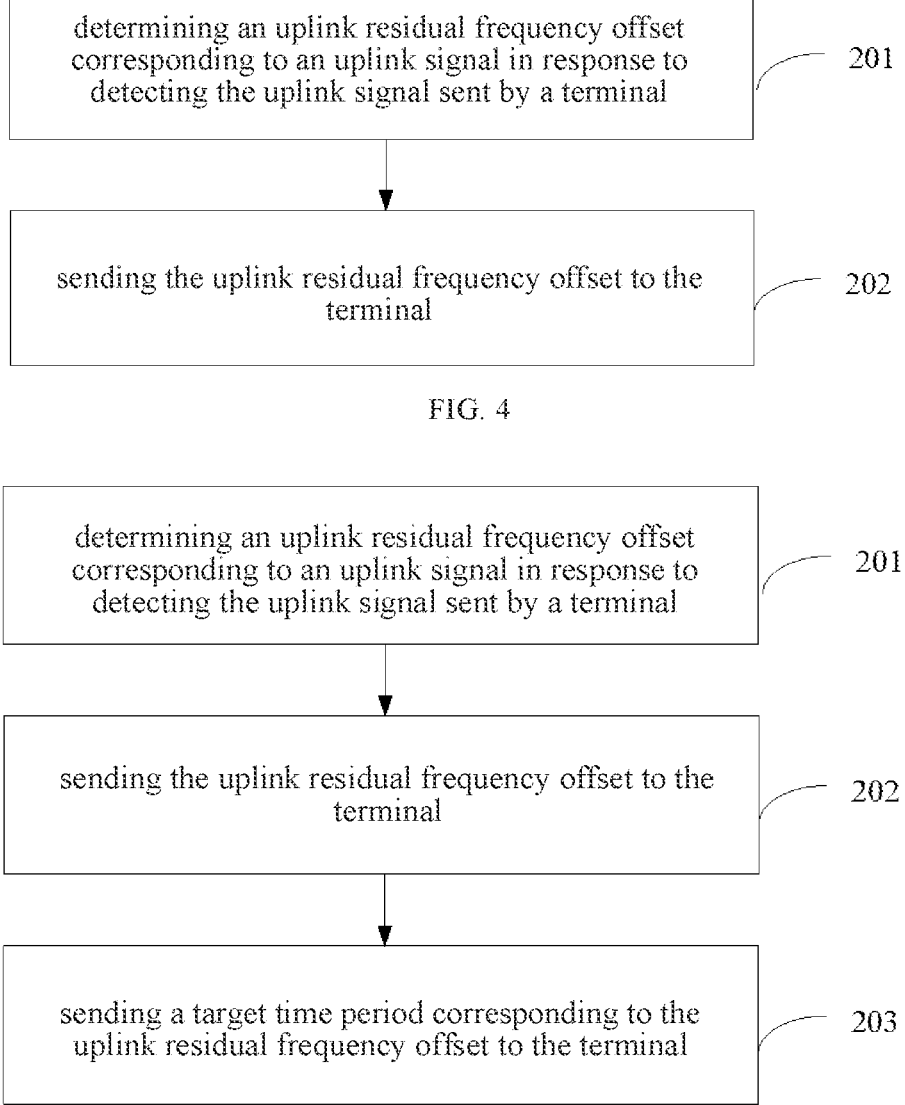

determining an uplink residual frequency offset corresponding to an uplink signal in response to detecting the uplink signal sent by a terminal — 201 sending the uplink residual frequency offset to the terminal — 202

FIG. 4 determining an uplink residual frequency offset corresponding to an uplink signal in response to detecting the uplink signal sent by a terminal — 201 sending the uplink residual frequency offset to the terminal — 202 sending a target time period corresponding to the uplink residual frequency offset to the terminal — 203

FIG. 5

FREQUENCY OFFSET COMPENSATION AND CALIBRATION METHOD AND APPARATUS, AND STORAGE MEDIUM

CROSS-REFERENCE TO RELATED APPLICATIONS

The present application is a national stage of International Application No. PCT/CN2020/107150, filed on Aug. 5, 2020, the entire contents of which are incorporated herein by reference.

TECHNICAL FIELD

The present disclosure relates to the technical field of communication, and in particular to a method for compensating for and calibrating a frequency offset, a device for compensating for and calibrating a frequency offset, and a storage medium.

BACKGROUND

When a mobile station moves in a direction at a constant speed, phase and frequency of a signal sent and/or received by the mobile station will change due to difference in a propagation path, and the change is generally called Doppler frequency shift.

In a terrestrial communication system, with a communication technology, such as a $5^{th}$ generation mobile network (5G) new radio (NR), a process of local estimation and local compensation performed by a terminal or a base station is used to reduce the effect of the Doppler frequency shift.

However, in a non-terrestrial network (NTN), communication satellites move at a high speed, which will generate a large Doppler frequency shift, and a speed of the change of Doppler frequency shift is relatively fast. An existing frequency offset compensation process used by the terrestrial communication system cannot effectively track and compensate for the frequency offset in the case, which will cause interference between multi-carriers and multi-users, resulting in a decline in receiving performance.

SUMMARY

According to a first aspect of embodiments of the present disclosure, a method for compensating for and calibrating a frequency offset is provided. The method for compensating for and calibrating the frequency offset is performed by a terminal and includes: compensating or precompensating a target frequency according to a downlink frequency offset; obtaining an uplink residual frequency offset sent by a network device, the uplink residual frequency offset corresponding to an uplink signal sent by the terminal, and calibrating a compensation frequency or a precompensation frequency for the target frequency according to the uplink residual frequency offset.

According to a second aspect of embodiments of the present disclosure, a method for compensating for and calibrating a frequency offset is provided. The method for compensating for and calibrating the frequency offset is performed by a network device and includes: determining an uplink residual frequency offset corresponding to an uplink signal in response to detecting the uplink signal sent by a terminal; and sending the uplink residual frequency offset to the terminal.

According to a third aspect of embodiments of the present disclosure, a non-transitory computer-readable storage medium is provided. The non-transitory computer-readable storage medium has stored therein computer programs that, when executed by a processor, cause the processor to perform the method for compensating for and calibrating the frequency offset in the first aspect.

According to a fourth aspect of embodiments of the present disclosure, a non-transitory computer-readable storage medium is provided. The non-transitory computer-readable storage medium has stored therein computer programs that, when executed by a processor, cause the processor to perform the method for compensating for and calibrating the frequency offset in the second aspect.

According to a fifth aspect of embodiments of the present disclosure, a device for compensating for and calibrating a frequency offset is provided. The device for compensating for and calibrating the frequency offset includes a processor; and a memory for storing instructions executable by the processor. The processor is configured to perform the method for compensating for and calibrating the frequency offset in the first aspect.

According to a sixth aspect of embodiments of the present disclosure, a device for compensating for and calibrating a frequency offset is provided. The device for compensating for and calibrating the frequency offset includes a processor; and a memory for storing instructions executable by the processor. The processor is configured to perform the method for compensating for and calibrating the frequency offset in the second aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of embodiments of the present disclosure.

FIG. 2B is a flow chart illustrating a method for compensating for and calibrating a frequency offset according to an embodiment of the present disclosure.

FIG. 3 is a flow chart illustrating a method for compensating for and calibrating a frequency offset according to an embodiment of the present disclosure.

FIG. 4 is a flow chart illustrating a method for compensating for and calibrating a frequency offset according to an embodiment of the present disclosure.

FIG. 5 is a flow chart illustrating a method for compensating for and calibrating a frequency offset according to an embodiment of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims, "a/an", "said", and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly second information may also be called first information. Depending on the context, the word "if" as used herein may be interpreted as "upon" or "when" or "in response to determining".

Embodiments of the present disclosure provide a method for compensating for and calibrating a frequency offset, which may be used in a non-terrestrial network. In this network, a satellite moves at a high speed, which causes a relatively large Doppler frequency shift and a quick change. In order to solve the problem that the frequency offset in the case cannot be effectively tracked and compensated for with the existing frequency offset compensation process adopted by the terrestrial communication system, the present disclosure provides the following solutions.

The method for compensating for and calibrating the frequency offset in the present disclosure will be described at a terminal side as follows.

Figures 1, 2A:
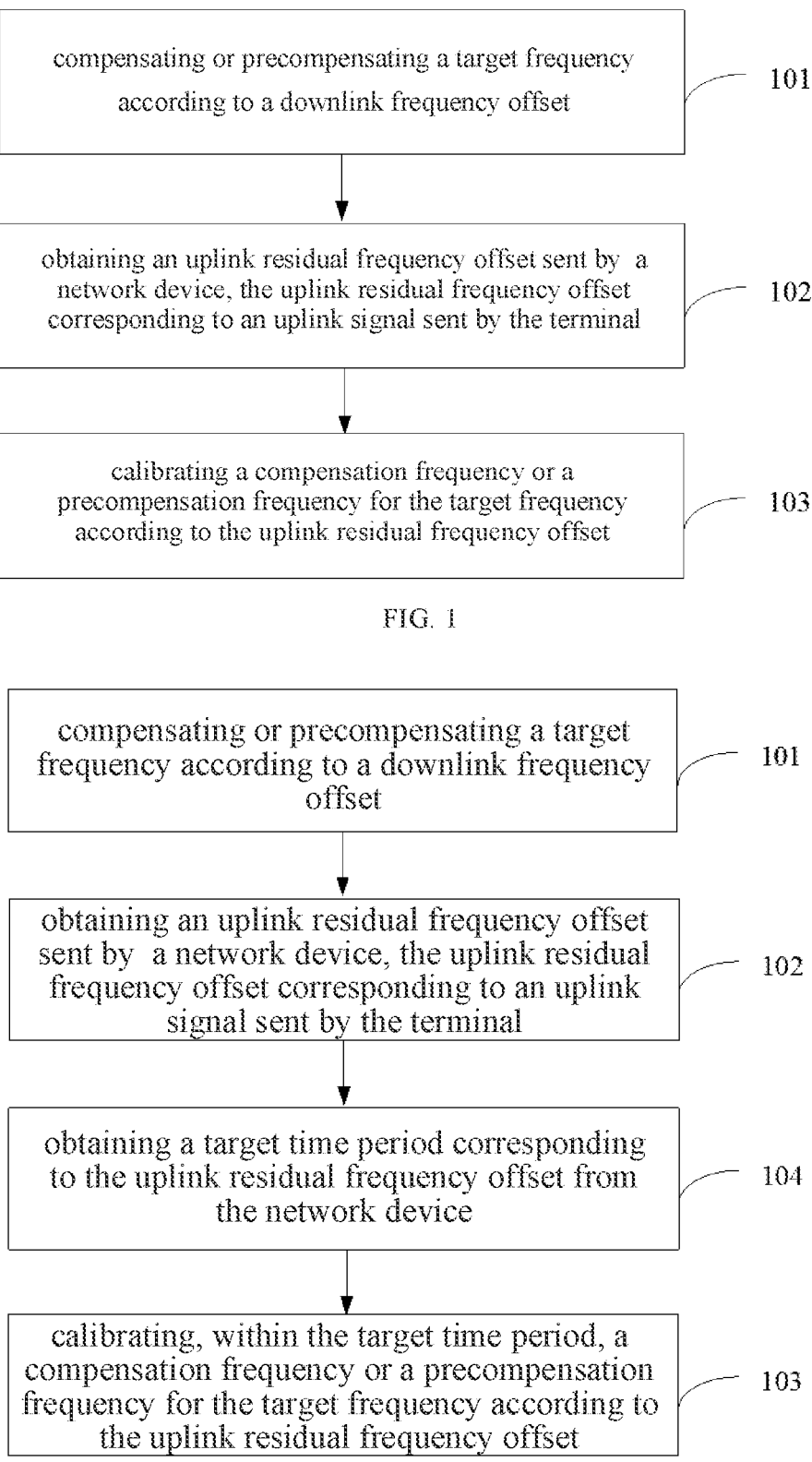
FIG. 1 is a flow chart illustrating a method for compensating for and calibrating a frequency offset according to an embodiment of the present disclosure.
FIG. 2A is a flow chart illustrating a method for compensating for and calibrating a frequency offset according to an embodiment of the present disclosure.

Embodiments of the present disclosure provide a method for compensating for and calibrating a frequency offset, which may be used in a terminal. FIG. 1 is a flow chart illustrating a method for compensating for and calibrating a frequency offset according to an embodiment. As shown in FIG. 1, the method may include the following operations as shown in blocks 101 to 103.

In block 101, a target frequency is compensated or precompensated according to a downlink frequency offset.

In embodiments of the present disclosure, the terminal may determine the downlink frequency offset according to a downlink signal sent by a network device. The downlink signal may include but not limited to a downlink reference signal.

In an embodiment, the terminal may obtain a downlink frequency offset $$\hat{f}_d^{DL}$$

with a unit of Hertz (Hz) according to a phase difference of different downlink signals and a time difference of different downlink signals received.

In embodiments of the present disclosure, the target frequency includes an uplink frequency $$f_c^{UL}$$

and/or a downlink frequency $$f_c^{DL}.$$

The terminal may compensate the downlink frequency $$f_c^{DL}$$

and/or precompensate the uplink frequency $$f_c^{UL}$$

according to the downlink frequency offset $$\hat{f}_d^{DL}$$

obtained.

In block 102, an uplink residual frequency offset sent by a network device is obtained, the uplink residual frequency offset corresponds to an uplink signal sent by the terminal.

In embodiments of the present disclosure, the terminal may send the uplink signal to the network device based on the precompensated uplink frequency, and the network device may determine the uplink residual frequency offset $\Delta f^{UL}$ corresponding to the uplink signal after receiving the uplink signal. The uplink residual frequency offset $\Delta f^{UL}$ may be a positive value or a negative value, which is not limited in the present disclosure.

In block 103, a compensation frequency or a precompensation frequency for the target frequency is calibrated according to the uplink residual frequency offset.

In embodiments of the present disclosure, after the terminal receives the uplink residual frequency offset $\Delta f^{UL}$ sent by the network device, the terminal may calibrate the compensation frequency for the downlink frequency $$f_c^{DL},$$

and/or calibrate the precompensation frequency for the uplink frequency $$f_c^{UL}.$$

In the above-mentioned embodiments, the frequency offset may be compensated or precompensated for and calibrated in the non-terrestrial network, to effectively track and compensate for the Doppler frequency shift of the satellite communication link and improve the communication quality.

In an optional embodiment, the operation in block 101 may include compensating the downlink frequency and/or precompensating the uplink frequency.

In embodiments of the present disclosure, the uplink frequency may be precompensated in the following manner.

A first factor is determined according to the downlink frequency and the uplink frequency, and the precompensation frequency for precompensating the uplink frequency is determined according to the first factor and the downlink frequency offset.

The first factor is a factor for mapping the downlink frequency offset to the uplink frequency, to precompensate the uplink frequency, which may be represented by a quotient of the uplink frequency and the downlink frequency. Further, a product value of the first factor and the downlink frequency offset may be used as the precompensation frequency $A_1$ for precompensating the uplink frequency, which may be expressed by Formula 1 as follows.

$$A_1 = \frac{f_c^{UL}}{f_c^{DL}} \times \hat{f}_d^{DL} \qquad \text{Formula 1}$$

where $$f_c^{UL}$$

represents an uplink frequency, $$f_c^{DL}$$

represents a downlink frequency, $$\frac{f_c^{UL}}{f_c^{DL}}$$

corresponds to a first factor, and $$\hat{f}_d^{DL}$$

represents a downlink frequency offset.

In addition, in embodiments of the present disclosure, the terminal may compensate the downlink frequency in the following manner.

The downlink frequency offset is determined as the compensation frequency for compensating the downlink frequency. The downlink frequency offset $$\hat{f}_d^{DL}$$

may be directly determined as the compensation frequency $A_2$ for compensating the downlink frequency.

In the above-mentioned embodiments, the target frequency includes the uplink frequency and/or the downlink frequency. The terminal may determine the first factor according to the downlink frequency and the uplink frequency, and determine the precompensation frequency for the uplink frequency according to the first factor and the downlink frequency offset. The terminal may determine the downlink frequency offset as the compensation frequency for compensating the downlink frequency. Therefore, compensating or precompensating the frequency offset is realized in the non-terrestrial network, and the usability is improved.

In an optional embodiment, the operation in block 103 may include calibrating the compensation frequency for the downlink frequency according to the uplink residual frequency offset, and/or calibrating the precompensation frequency for the uplink frequency according to the uplink residual frequency offset.

Calibrating the precompensation frequency for the uplink frequency according to the uplink residual frequency offset may include determining the uplink residual frequency offset as a first correction value for calibrating the precompensation frequency for the uplink frequency.

In embodiments of the present disclosure, the uplink residual frequency offset $\Delta f^{UL}$ may be directly determined as the first correction value $B_1$.

In addition, calibrating the compensation frequency for the downlink frequency according to the uplink residual frequency offset may include: determining a second factor according to the downlink frequency and the uplink frequency; and determining a second correction value for calibrating the compensation frequency for the downlink frequency according to the second factor and the uplink residual frequency offset.

In embodiments of the present disclosure, the second factor is a factor for mapping the uplink residual frequency offset to the downlink frequency, to determine the second calibration value for calibrating the compensation value for the downlink frequency, which may be represented as a quotient of the downlink frequency and the uplink frequency. Further, a product value of the second factor and the uplink residual frequency offset may be determined as the second correction value $B_2$, and expressed by Formula 2 as follows.

$$B_2 = \frac{f_c^{DL}}{f_c^{UL}} \times \Delta f^{UL} \qquad \text{Formula 2}$$

where $$\frac{f_c^{DL}}{f_c^{UL}}$$

corresponds to a second factor, and $\Delta f^{UL}$ represents an uplink residual frequency offset.

In the above-mentioned embodiments, the terminal may determine the uplink residual frequency as the first correction value for calibrating the precompensation frequency for the uplink frequency. The second factor may be determined according to the downlink frequency and the uplink frequency, and the second correction value for calibrating the compensation frequency for the downlink frequency may be determined according to the second factor and the uplink residual frequency offset. Therefore, calibrating the frequency offset is realized in the non-terrestrial network, and the usability is improved.

In an optional embodiment, FIG. 2A shows a flow chart illustrating a method for compensating for and calibrating a frequency offset based on the embodiment shown in FIG. 1. As shown in FIG. 2A, the method further includes an operation shown in block 104.

In block 104, a target time period corresponding to the uplink residual frequency offset is obtained from the network device.

In embodiments of the present disclosure, the terminal may receive the target time period corresponding to the uplink residual frequency offset sent by the network device.

Alternatively, FIG. 2B shows a flow chart illustrating a method for compensating for and calibrating a frequency offset based on the embodiment shown in FIG. 1. As shown in FIG. 2B, the method further includes an operation in block 105.

In block 105, a target time period corresponding to the uplink residual frequency offset is determined according to a predetermined setting.

In embodiments of the present disclosure, the terminal may determine the target time period according to the predetermined setting, which includes but not limited to an agreement in a protocol.

Correspondingly, after determining the target time period, the above-mentioned operation in block 103 may include calibrating, within the target time period, the compensation frequency or the precompensation frequency for the target frequency according to the uplink residual frequency offset.

In embodiments of the present disclosure, the terminal may calibrate the precompensation frequency for the uplink frequency and/or the compensation frequency for the downlink frequency according to the uplink residual frequency offset obtained from the network device within the target time period.

In the above-mentioned embodiments, the terminal may obtain the target time period corresponding to the uplink residual frequency offset from the network device, or may determine the target time period according to the predetermined setting. Therefore, within the target time period, the compensation frequency or the precompensation frequency for the target frequency is calibrated according to the uplink residual frequency offset, which may be easy to be implemented and has a high usability.

In an optional embodiment, FIG. 3 shows a flow chart illustrating a method for compensating for and calibrating a frequency offset based on the embodiment shown in FIG. 1, and as shown in FIG. 3, the method further includes an operation in block 106.

In block 106, within the target time period, the target frequency is compensated or precompensated with the compensation frequency calibrated or the precompensation frequency calibrated.

In embodiments of the present disclosure, after the precompensation frequency for the uplink frequency is calibrated according to the uplink residual frequency offset, a corresponding uplink frequency offset may be determined as $$\frac{f_c^{UL}}{f_c^{DL}} \times \hat{f}_d^{DL} + \Delta f^{UL},$$

and the uplink frequency offset may be used to precompensate the uplink frequency. The compensated uplink frequency is $$f_c^{UL} - \frac{f_c^{UL}}{f_c^{DL}} \times \hat{f}_d^{DL} - \Delta f^{UL},$$

and the terminal may the send the uplink signal to the network device based on this uplink frequency.

After the uplink residual frequency offset is used to calibrate the compensation frequency for the downlink frequency, the downlink frequency offset may be determined as $$\hat{f}_d^{DL} + \frac{f_c^{DL}}{f_c^{UL}} \times \Delta f^{UL},$$

and the downlink frequency offset may be used to compensate the downlink frequency. The compensated downlink frequency is $$f_c^{DL} + \hat{f}_d^{DL} + \frac{f_c^{DL}}{f_c^{UL}} \times \Delta f^{UL},$$

and the terminal may receive the downlink signal sent by the network device based on this downlink frequency.

In the above-mentioned embodiments, the terminal may use the uplink residual frequency offset to calibrate the compensation frequency or precompensation frequency for the target frequency, and use the compensation frequency calibrated or precompensation frequency calibrated to compensate or precompensate for the target frequency, respectively, which realizes the compensating or precompensating for and calibrating the frequency offset in the non-terrestrial network, and effectively tracks and compensates for the Doppler frequency shift of the satellite communication link, thus improving the communication quality.

In an optional embodiment, in response to the terminal compensating or precompensating for the target frequency every time, the terminal may communicate with the network device based on the target frequency compensated or precompensated.

For example, after the operation in block 101 is performed, the terminal precompensates the uplink frequency, and the terminal may send the uplink signal to the network device based on the precompensated uplink frequency $$(f_c^{UL} - A_1) = \left( f_c^{UL} - \frac{f_c^{UL}}{f_c^{DL}} \times \hat{f}_c^{DL} \right).$$

The terminal may compensate the downlink frequency, and the terminal may receive the downlink signal sent by the network device based on the compensated downlink frequency $$\left(f_c^{DL} + A_2\right) = \left(f_c^{DL} + f_c^{\hat{D}L}\right).$$

For example, after the operation in block 106 is performed, the terminal may send the uplink signal to the network device based on the precompensated uplink frequency $$f_c^{UL} - \frac{f_c^{UL}}{f_c^{DL}} \times f_c^{\hat{D}L} - \triangle f^{UL},$$

and the terminal may receive the downlink signal sent by the network device based on the compensated downlink frequency $$f_c^{DL} + f_d^{\hat{D}L} + \frac{f_c^{DL}}{f_c^{UL}} \times \triangle f^{UL}.$$

In the above-mentioned embodiments, in response to the terminal compensating or precompensating for the target frequency very time, the terminal may communicate with the network device based on the target frequency compensated or pre-compensated. Therefore, the Doppler frequency shift of the satellite communication link may be tracked and compensated for in time and effectively, and the communication quality can be improved.

In an optional embodiment, the terminal may use the uplink residual frequency offset to calibrate the compensation frequency or precompensation frequency for the target frequency, determine the frequency offset calibrated as a new frequency offset, and return to perform the operation in block 101.

That is, $$\frac{f_c^{UL}}{f_c^{DL}} \times f_c^{\hat{D}L} + \triangle f^{UL}$$

is determined as the new uplink frequency offset, $$f_d^{\hat{D}L} + \frac{f_c^{DL}}{f_c^{UL}} \times \triangle f^{UL}$$

is determined as the new downlink frequency offset, and with these new settings, the above-mentioned operation in block 101 is performed again.

In the above-mentioned embodiments, the terminal may use the uplink residual frequency offset to calibrate the compensation frequency or precompensation frequency for the target frequency, determine the frequency offset calibrated as the new frequency offset, and return to compensate or precompensate for the target frequency according to the downlink frequency offset. By compensating or precompensating and calibrating the target frequency in iterations, the Doppler frequency shift of the satellite communication link can be tracked and compensated for and thus the communication quality may be improved.

A method for compensating for and calibrating a frequency offset in the present disclosure will be described at a network device side as follows.

Embodiments of the present disclosure provides a method for compensating for and calibrating a frequency offset. The method for compensating for and calibrating the frequency offset may be applied to a network device including but not limited to satellites. FIG. 4 is a flow chart illustrating a method for compensating for and calibrating a frequency offset according to an embodiment of the present disclosure, and as shown in FIG. 4, the method may include the following operations in blocks 201 to 202.

In block 201, an uplink residual frequency offset corresponding to an uplink signal is determined in response to detecting the uplink signal sent from a terminal.

In embodiments of the present disclosure, after the terminal receives the downlink signal sent by the network device, the terminal may precompensate the uplink frequency and/or compensate for the downlink frequency according to the downlink frequency offset determined. The terminal may send the uplink signal to the network device based on the uplink frequency precompensated.

When the network device detects the uplink signal sent by the terminal, the network device may determine the uplink residual frequency offset corresponding to the uplink frequency used by the uplink signal. The determination process may be the same as the process for determining the downlink frequency offset by the terminal, which will not be repeated here.

In block 202, the uplink residual frequency offset is sent to the terminal.

In embodiments of the present disclosure, a value of the uplink residual frequency offset may be sent to the terminal. The terminal may calibrate the compensation frequency for the downlink frequency and/or calibrate the precompensation frequency for the uplink frequency according to the uplink residual frequency.

In the above-mentioned embodiments, the frequency offset may be compensated for or precompensated for and calibrated in the non-terrestrial network, and the Doppler frequency shift of the satellite communication link may be effectively tracked and compensated for, thus improving the communication quality.

In an optional embodiment, FIG. 5 shows a flow chart illustrating a method for compensating for and calibrating a frequency offset based on the embodiment shown in FIG. 4. As shown in FIG. 5, the method further includes an operation in block 203.

In block 203, a target time period corresponding to the uplink residual frequency offset is sent to the terminal.

In embodiments of the present disclosure, the satellite may determine the target time period corresponding to the uplink residual frequency offset according to a moving speed and a moving direction of the satellite, and inform the terminal of the target time period or configure the target time period in advance. The terminal may calibrate the compensation frequency or the precompensation frequency for the target frequency according to the uplink residual frequency offset within the target time period, and use the compensation frequency calibrated or precompensation frequency calibrated to compensate or precompensate the target frequency.

In the above-mentioned embodiment, the base station may send the target time period corresponding to the uplink residual frequency offset to the terminal, and the terminal may, within the target time period, calibrate/adjust the compensation frequency or the precompensation frequency for the target frequency according to the uplink residual frequency offset, which may be easy to be implemented and has a high usability.

Figure 6:
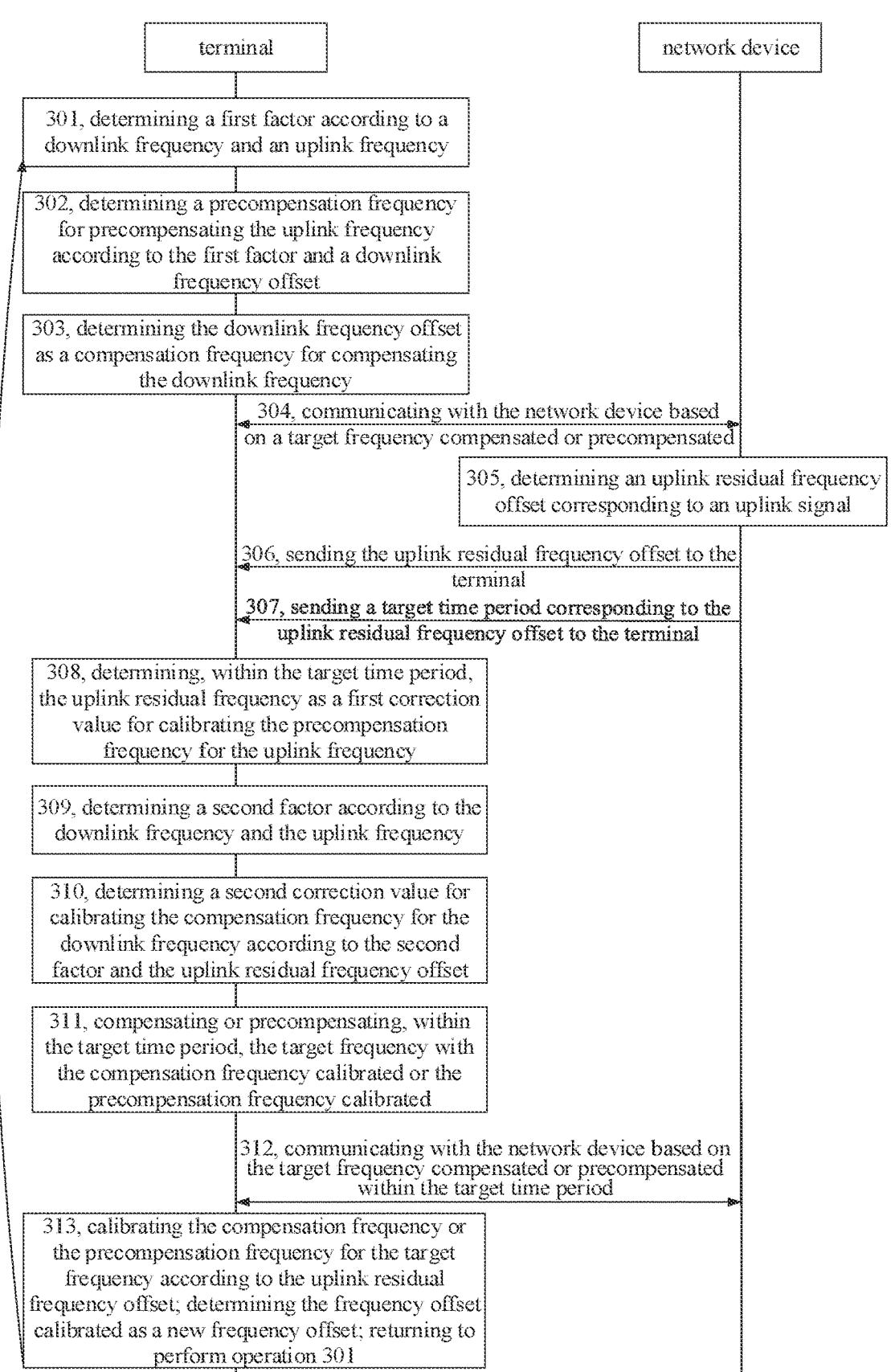
FIG. 6 is a flow chart illustrating a method for compensating for and calibrating a frequency offset according to an embodiment of the present disclosure.

In an optional embodiment, FIG. 6 shows a flow chart illustrating a method for compensating for and calibrating a frequency offset according to an embodiment. As shown in FIG. 6, the method may include the following operations in blocks 301 to 313.

In block 301, a terminal determines a first factor according to a downlink frequency and an uplink frequency.

In block 302, the terminal determines a precompensation frequency for the uplink frequency according to the first factor and the downlink frequency offset.

In embodiments of the present disclosure, the precompensation frequency is $$\frac{f_c^{DL}}{f_c^{UL}} \times f_d^{\hat{D}L}.$$

In block 303, the terminal determines the downlink frequency offset as a compensation frequency for the downlink frequency.

In embodiments of the present disclosure, the compensation frequency is $$f_d^{\hat{D}L}.$$

In block 304, the terminal communicates with the network device based on the target frequency compensated or pre-compensated.

In embodiments of the present disclosure, the uplink frequency precompensated is $$f_c^{UL} - \frac{f_c^{UL}}{f_c^{DL}} \times f_d^{\hat{D}L},$$

and the terminal sends an uplink signal to the network device based on the uplink frequency. The downlink frequency compensated is $$f_c^{DL} + f_d^{\hat{D}L},$$

and the terminal receives a downlink signal sent by the network device based on the downlink frequency.

In block 305, the network device determines the uplink residual frequency offset corresponding to the uplink signal.

In block 306, the network device sends the uplink residual frequency to the terminal.

In block 307, the network device sends a target time period corresponding to the uplink residual frequency offset to the terminal.

In block 308, the terminal, within the target time period, determines the uplink residual frequency offset as a first correction value for calibrating the precompensation frequency for the uplink frequency.

In embodiments of the present disclosure, the first correction value is $\Delta f^{UL}$.

In block 309, the terminal determines a second factor according to the downlink frequency and the uplink frequency.

In block 310, the terminal determines a second correction value for calibrating the compensation frequency for the downlink frequency according to the second factor and the uplink residual frequency offset.

In embodiments of the present disclosure, the second modified value is $$\frac{f_c^{DL}}{f_c^{UL}} \times \Delta f^{UL}.$$

In block 311, the terminal, within the target time period, compensates the target frequency with the compensation frequency calibrated or precompensates the target frequency with the precompensation frequency calibrated according to the uplink residual frequency offset.

In embodiments of the present disclosure, the uplink frequency offset obtained by calibrating the precompensation frequency for the uplink frequency with the uplink residual frequency offset is $$\frac{f_c^{UL}}{f_c^{DL}} \times f_c^{\hat{D}L} + \Delta f^{UL},$$

and the downlink frequency offset obtained is $$f_c^{UL} - \frac{f_c^{UL}}{f_c^{DL}} \times f_c^{\hat{D}L} - \Delta f^{UL}.$$

The uplink frequency obtained after the precompensating is $$f_c^{UL} - \frac{f_c^{UL}}{f_c^{DL}} \times f_c^{\hat{D}L} - \Delta f^{UL},$$

and the downlink frequency obtained by the compensation is $$f_c^{DL} + f_c^{\hat{D}L} + \frac{f_c^{DL}}{f_c^{UL}} \times \Delta f^{UL}.$$

In block 312, the terminal communicates with the network device based on the target frequency compensated or precompensated within the target time period.

In block 313, the compensation frequency or the precompensation frequency for the target frequency is calibrated by using the uplink residual frequency offset, and the frequency offset calibrated is determined as a new frequency offset, and the process returns to perform the operation in block 301 with the new frequency offset.

In the above-mentioned embodiments, the frequency offset is compensated for and calibrated in the non-terrestrial network, and the Doppler frequency shift of the satellite communication link may be effectively tracked and compensated for, thus improving the communication quality.

Corresponding to the above-mentioned embodiments of the method for implementing application functions, the present disclosure further provides in embodiments apparatuses for implementing application function(s).

Figure 7:
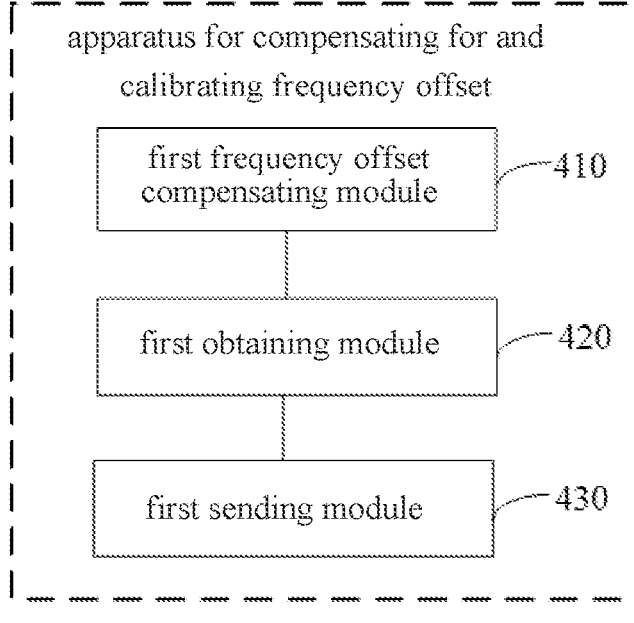
FIG. 7 is a block diagram illustrating an apparatus for compensating for and calibrating a frequency offset according to an embodiment of the present disclosure.

FIG. 7 is a block diagram illustrating an apparatus for compensating for and calibrating a frequency offset according to an embodiment. As shown in FIG. 7, the apparatus is applied to a terminal and includes a first frequency offset compensating module 410, a first obtaining module 420 and a calibrating module 430. The first frequency offset compensating module 410 is configured to compensate or pre-compensate for a target frequency according to a downlink frequency offset. The first obtaining module 420 is configured to obtain an uplink residual frequency offset sent by a network device, the uplink residual frequency offset corresponds to an uplink signal sent by the terminal. The calibrating module 430 is configured to calibrate a compensation frequency or a precompensation frequency for the target frequency according to the uplink residual frequency offset.

Optionally, the target frequency includes an uplink frequency and/or a downlink frequency. The first frequency offset compensating module is configured to determine a first factor according to the downlink frequency and the uplink frequency, and determine the precompensation frequency for precompensating for the uplink frequency according to the first factor and the downlink frequency offset; and/or determine the downlink frequency offset as the compensation frequency for compensating for the downlink frequency.

Optionally, the calibrating module is configured to determine the uplink residual frequency as a first correction value for calibrating the precompensation frequency for the uplink frequency; and/or determine a second factor according to the downlink frequency and the uplink frequency, and determine a second correction value for calibrating the compensation frequency for the downlink frequency according to the second factor and the uplink residual frequency offset.

Optionally, the apparatus for compensating for and calibrating the frequency offset further includes a second obtaining module or a first determining module. The second obtaining module is configured to obtain a target time period corresponding to the uplink residual frequency offset from the network device. The first determining module is configured to determine a target time period corresponding to the uplink residual frequency offset according to a predetermined setting. The calibrating module is configured to calibrate, within the target time period, the compensation frequency or the precompensation frequency for the target frequency according to the uplink residual frequency offset.

Optionally, the apparatus for compensating for and calibrating the frequency offset further includes a second frequency offset compensating module. The second frequency offset compensating module is configured to compensate or precompensate, within the target time period, the target frequency with the compensation frequency calibrated or the precompensation frequency calibrated.

Optionally, the apparatus for compensating for and calibrating the frequency offset further includes a communicating module. The communicating module is configured to communicate with the network device based on the target frequency compensated or precompensated in response to compensating or precompensating for the target frequency every time.

Optionally, the apparatus for compensating for and calibrating the frequency offset further includes a controlling module. The controlling module is configured to calibrate the compensation frequency or the precompensation frequency for the target frequency with the uplink residual frequency offset; determine the frequency offset calibrated as a new frequency offset; and control the first frequency offset compensating module to compensate or precompensate for the target frequency according to the downlink frequency offset.

Figure 8:
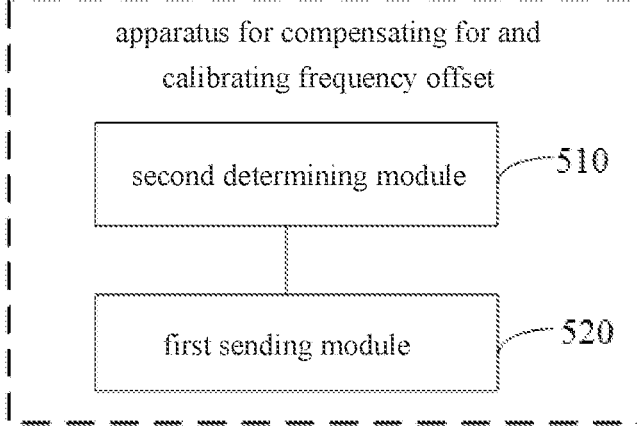
FIG. 8 is a block diagram illustrating an apparatus for compensating for and calibrating a frequency offset according to an embodiment of the present disclosure.

FIG. 8 is a block diagram illustrating an apparatus for compensating for and calibrating a frequency offset according to an embodiment. As shown in FIG. 8, the apparatus is applied to a network device and includes a second determining module 510 and a first sending module 520. The second determining module 510 is configured to determine an uplink residual frequency offset corresponding to an uplink signal in response to detecting the uplink signal sent by a terminal. The first sending module 520 is configured to send the uplink residual frequency offset to the terminal.

Optionally, the apparatus for compensating for and calibrating the frequency offset further includes a second sending module. The second sending module is configured to send a target time period corresponding to the uplink residual frequency offset to the terminal.

Since the apparatus embodiments substantially correspond to the method embodiments, reference is made to the partial description of the method embodiments. The above-described apparatus embodiments are merely for the purpose of illustration, in which the modules described as separate components may be or may not be physically separated, and the components displayed as modules may be or may not be physical modules, that is, either located at one place or distributed onto a plurality of network modules. The object of embodiments of the present disclosure may be achieved by some or all of the modules in accordance with practical requirements. It would be appreciated and performed by those skilled in the art without creative efforts.

Accordingly, the present disclosure further provides a computer-readable storage medium. The computer-readable storage medium has stored therein computer executable instructions that cause the method for compensating for and calibrating the frequency offset on the terminal side to be implemented.

Accordingly, the present disclosure further provides a computer-readable storage medium. The computer-readable storage medium has stored therein computer executable instructions that cause the method for compensating for and calibrating the frequency offset on the network device side to be implemented.

Accordingly, the present disclosure further provides a device for compensating for and calibrating a frequency offset. The device for compensating for and calibrating the frequency offset includes a processor; and a memory for storing instructions executable by the processor. The processer is configured to perform any one of the methods for compensating for and calibrating the frequency offset at the terminal side.

Figure 9:
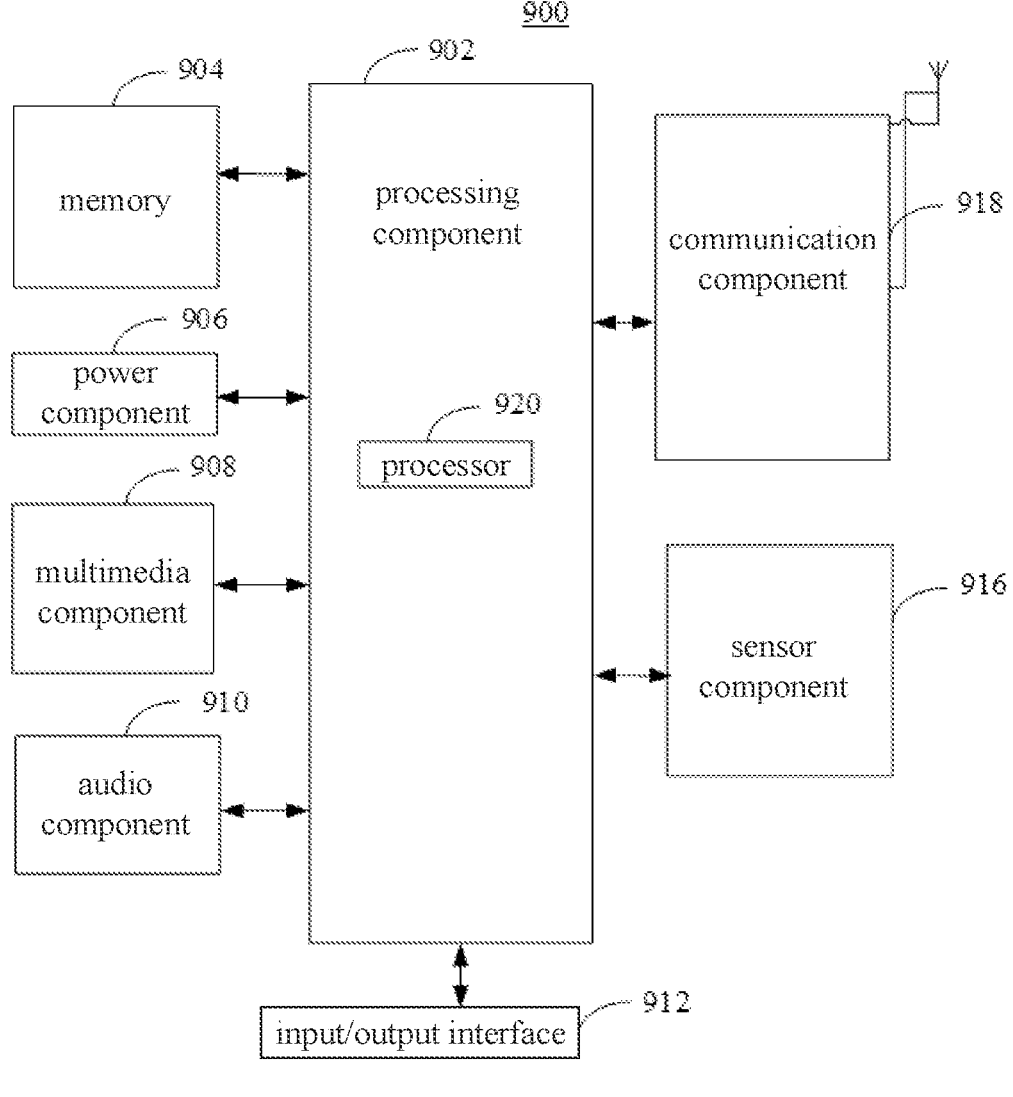
FIG. 9 is a block diagram illustrating a device for compensating for and calibrating a frequency offset according to an embodiment of the present disclosure.

FIG. 9 is a block diagram showing an electronic device 900 according to an embodiment of the present disclosure. For example, the electronic device 900 may be a terminal.

Referring to FIG. 9, the electronic device 900 may include one or more the following components: a processing component 902, a memory 904, a power component 906, a multimedia component 908, an audio component 910, an input/output (I/O) interface 912, a sensor component 916, and a communication component 918.

The processing component 902 typically controls overall operations of the electronic device 900, such as the operations associated with display, telephone calls, data communications, camera operations, and recording operations. The processing component 902 may include one or more processor 920 to execute instructions to perform all or some of the steps/operations of the above-mentioned methods. Moreover, the processing component 902 may include one or more modules to facilitate interaction between the processing component 902 and other components. For example, the processing component 902 may include a multimedia module to facilitate the interaction between the multimedia component 908 and the processing component 902. For example, the processing component 902 may read the executable instructions from the memory to implement the steps/operations of the method for compensating for and calibrating the frequency offset in the above-mentioned embodiments.

The memory 904 is configured to store various types of data to support the operations at the electronic device 900. Examples of such data include instructions for any applications or methods operated on the electronic device 900, contact data, phonebook data, messages, pictures, videos, and the like. The memory 904 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read only-memory (ROM), a magnetic memory, a flash memory, a magnetic or an optical disk.

The power component 906 provides power to various components of the electronic device 900. The power component 906 may include a power management system, one or more power sources, and any other components associated with generation, management, and distribution of power in electronic device 900.

The multimedia component 908 includes a screen providing an output interface between the electronic device 900 and the user. In some embodiments, the multimedia component 908 includes a front camera and/or a rear camera. The front camera and/or the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the electronic device 900 is in an operation mode, such as a call mode, a recording mode, and a voice recognition mode. The received audio signals may be further stored in the memory 904 or transmitted via the communication component 918. In some embodiments, the audio component 910 further includes a speaker to output audio signals.

The I/O interface 912 provides an interface between the processing component 902 and peripheral interface modules, such as keyboards, click wheels, buttons, and the like. The buttons may include, but are not limited to, a home button, a volume button, a starting button, and a locking button.

The sensor component 916 includes one or more sensors to provide status assessments of various aspects of the electronic device 900. For example, the sensor component 914 may detect an open/closed status of the electronic device 900, relative positioning of components, such as the display and the keypad, of the electronic device 900, a change in position of the electronic device 900 or a component of the electronic device 900, a presence or absence of user contact with the electronic device 900, an orientation or acceleration/deceleration of the electronic device 900, and a change in temperature of the electronic device 900. The sensor component 916 may include a proximity sensor configured to detect the presence of nearby objects without any physical contact. The sensor assembly 916 may also include a light sensor, such as a CMOS or CCD image sensor, for use in imaging applications. In some embodiments, the sensor component 916 may also include an acceleration sensor, a gyroscope sensor, a magnetic sensor, a pressure sensor or a temperature sensor.

The communication component 918 is configured to facilitate communication, wired or wireless, between the electronic device 900 and other devices. The electronic device 900 may access a wireless network based on a communication standards, such as WiFi, 2G or 3G, or a combination thereof. In one illustrative embodiment, the communication component 918 receives a broadcast signal or broadcast associated information from an external broadcast management system via a broadcast channel. In one illustrative embodiment, the communication component 918 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an illustrative embodiment, the electronic device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing the method for compensating for and calibrating the frequency offset described above.

In an illustrative embodiment, there is also provided a non-transitory computer-readable storage medium including instructions, such as included in the memory 904, executable by the processor 920 in the electronic device 900, for performing the above-mentioned method for compensating for and calibrating the frequency offset. For example, the non-transitory computer-readable storage medium may be a ROM, a random access memory (RAM), a CD-ROM, a magnetic tape, a floppy disk, an optical data storage device, and the like.

The present disclosure also provides a device for compensating for and calibrating a frequency offset. The device for compensating for and calibrating a frequency offset includes a processor; and a memory for storing instructions executable by the processor. The processor is configured to perform any one of the methods for compensating for and calibrating the frequency offset at the network device side.

Figure 10:
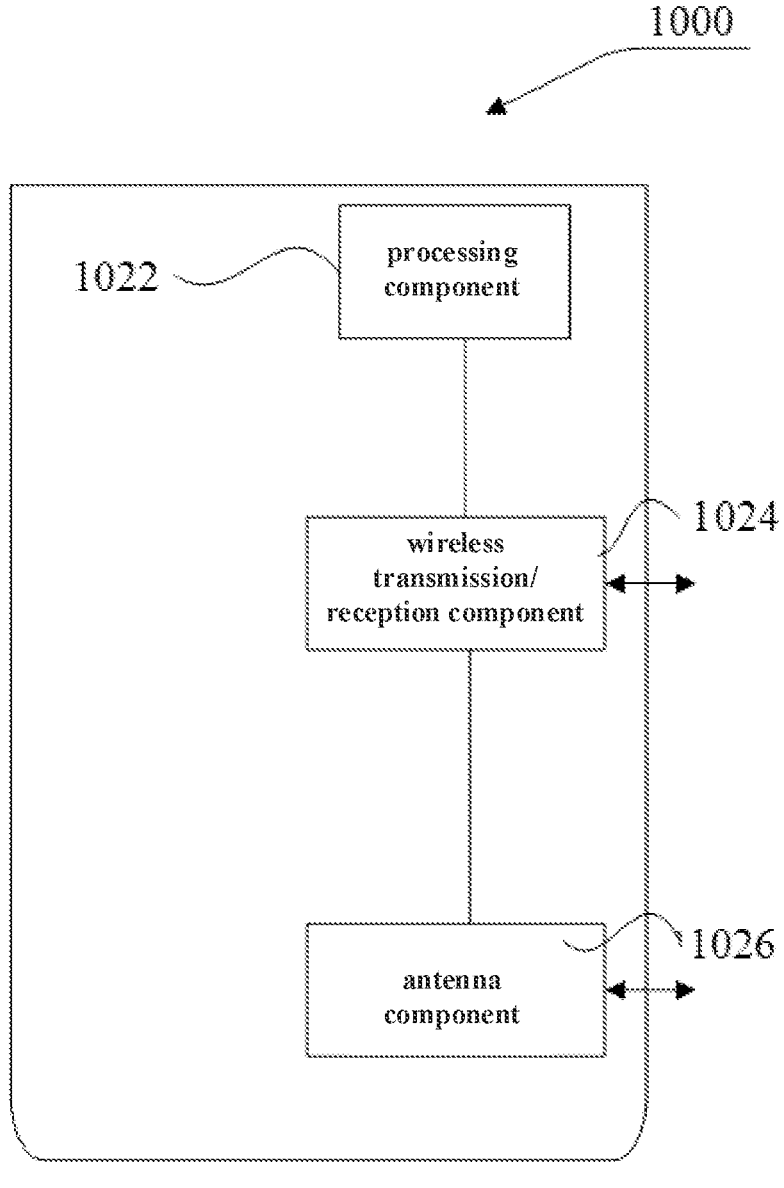
FIG. 10 is a block diagram illustrating a device for compensating for and calibrating a frequency offset according to an embodiment of the present disclosure.

FIG. 10 is a block diagram showing a device 1000 for compensating for and calibrating a frequency offset according to an embodiment. The device 1000 may be provided as a network device, such as a satellite. Referring to FIG. 10, the device 1000 includes a processing component 1022, a wireless transmission/reception component 1024, an antenna component 1026, and a signal processing section specific to a wireless interface. The processing component 1022 may include one or more processors.

The processer of the processing component 1022 may be configured to perform the method for compensating for and calibrating the frequency offset at the network device side.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from embodiments of the present disclosure as come within known or customary practice in the art. In addition, for those skilled in the art, without departing from the principle of the present disclosure, the operations or modules in various embodiments of the present disclosure may also be replaced or combined, and these replacements and combinations could also be regarded as the protection scope of the present disclosure. It is intended that the specification and the examples be considered as illustrative only, with a true scope and spirit of the embodiments of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of embodiments of the present disclosure only be limited by the appended claims.

What is claimed is:

1. A method for compensating for and calibrating a frequency offset, performed by a terminal and comprising:
   compensating or precompensating a target frequency according to a downlink frequency offset, wherein the downlink frequency offset is determined by the terminal based on a phase difference of different downlink signals and a time difference of downlink signals received;
   obtaining an uplink residual frequency offset sent by a network device, the uplink residual frequency offset corresponding to an uplink signal sent by the terminal, wherein the uplink residual frequency offset is determined by the network device after receiving the uplink signal transmitted by the terminal based on a precompensated uplink frequency; and
   calibrating a compensation frequency or a precompensation frequency for the target frequency according to the uplink residual frequency offset.

2. The method according to claim 1, wherein the target frequency comprises at least one of an uplink frequency or a downlink frequency; and
   wherein compensating or precompensating the target frequency according to the downlink frequency offset comprises at least one of:
   determining a first factor according to the downlink frequency and the uplink frequency, and determining the precompensation frequency for precompensating the uplink frequency according to the first factor and the downlink frequency offset; or
   determining the downlink frequency offset as the compensation frequency for compensating the downlink frequency.

3. The method according to claim 2, wherein calibrating the compensation frequency or the precompensation frequency for the target frequency according to the uplink residual frequency offset comprises at least one of:
   determining the uplink residual frequency as a first correction value for calibrating the precompensation frequency for the uplink frequency; or
   determining a second factor according to the downlink frequency and the uplink frequency, and determining a second correction value for calibrating the compensation frequency for the downlink frequency according to the second factor and the uplink residual frequency offset.

4. The method according to claim 1, further comprising at least one of: obtaining a target time period corresponding to the uplink residual frequency offset from the network device, or determining the target time period corresponding to the uplink residual frequency offset according to a predetermined setting;

wherein calibrating the compensation frequency or the precompensation frequency for the target frequency according to the uplink residual frequency offset comprises:
   calibrating, within the target time period, the compensation frequency or the precompensation frequency for the target frequency according to the uplink residual frequency offset.

5. The method according to claim 4, further comprising:
   compensating or precompensating, within the target time period, the target frequency with the compensation frequency calibrated or the precompensation frequency calibrated.

6. The method according to claim 1, further comprising:
   communicating with the network device based on the target frequency compensated or precompensated in response to compensating or precompensating the target frequency every time.

7. The method according to claim 4, further comprising:
   calibrating the compensation frequency or the precompensation frequency for the target frequency with the uplink residual frequency offset;
   determining the frequency offset calibrated as a new frequency offset; and
   repeating the compensating or precompensating the target frequency according to the downlink frequency offset.

8. A method for compensating for and calibrating a frequency offset, performed by a network device and comprising:
   determining an uplink residual frequency offset corresponding to an uplink signal in response to detecting the uplink signal sent by a terminal, wherein the uplink residual frequency offset is determined by the network device after receiving the uplink signal transmitted by the terminal based on a precompensated uplink frequency; and
   sending the uplink residual frequency offset to the terminal, wherein the terminal calibrates a compensation frequency or a precompensation frequency for a target frequency according to the uplink residual frequency offset, wherein the terminal compensates or precompensates the target frequency according to a downlink frequency offset, and the downlink frequency offset is determined by the terminal based on a phase difference of different downlink signals and a time difference of the downlink signals received.

9. The method according to claim 8, further comprising:
   sending a target time period corresponding to the uplink residual frequency offset to the terminal.

10. A non-transitory computer-readable storage medium having stored therein computer programs that, when executed by a processor, cause the processor to perform the method according to claim 1.

11. A non-transitory computer-readable storage medium having stored therein computer programs that, when executed by a processor, cause the processor to perform the method according to claim 8.

12. A terminal, comprising:
   a processor; and
   a memory for storing instructions executable by the processor;
   wherein the processor is configured to perform:
   compensating or precompensating a target frequency according to a downlink frequency offset, wherein the downlink frequency offset is determined by the terminal based on a phase difference of different downlink signals and a time difference of downlink signals received;

obtaining an uplink residual frequency offset sent by a network device, the uplink residual frequency offset corresponding to an uplink signal sent by the terminal, wherein the uplink residual frequency offset is determined by the network device after receiving the uplink signal transmitted by the terminal based on a precompensated uplink frequency; and calibrating a compensation frequency or a precompensation frequency for the target frequency according to the uplink residual frequency offset.

13. A network device, comprising:

a processor; and a memory for storing instructions executable by the processor;

wherein the processor is configured to perform the method of claim 8.

14. The terminal according to claim 12, wherein the target frequency comprises at least one of an uplink frequency or a downlink frequency; and wherein the processor is further configured to perform at least one of:

determining a first factor according to the downlink frequency and the uplink frequency, and determining the precompensation frequency for precompensating the uplink frequency according to the first factor and the downlink frequency offset; or determining the downlink frequency offset as the compensation frequency for compensating the downlink frequency.

15. The terminal according to claim 14, wherein the processor is further configured to perform at least one of:

determining the uplink residual frequency as a first correction value for calibrating the precompensation frequency for the uplink frequency; or determining a second factor according to the downlink frequency and the uplink frequency, and determining a second correction value for calibrating the compensation frequency for the downlink frequency according to the second factor and the uplink residual frequency offset.

16. The terminal according to claim 12, wherein the processor is further configured to perform:

at least one of obtaining a target time period corresponding to the uplink residual frequency offset from the network device, or determining the target time period corresponding to the uplink residual frequency offset according to a predetermined setting; and calibrating, within the target time period, the compensation frequency or the precompensation frequency for the target frequency according to the uplink residual frequency offset.

17. The terminal according to claim 16, wherein the processor is further configured to perform:

compensating or precompensating, within the target time period, the target frequency with the compensation frequency calibrated or the precompensation frequency calibrated.

18. The terminal according to claim 12, wherein the processor is further configured to perform:

communicating with the network device based on the target frequency compensated or precompensated in response to compensating or precompensating the target frequency every time.

19. The terminal according to claim 16, wherein the processor is further configured to perform:

calibrating the compensation frequency or the precompensation frequency for the target frequency with the uplink residual frequency offset;

determining the frequency offset calibrated as a new frequency offset; and repeating the compensating or precompensating the target frequency according to the downlink frequency offset.

* * * * *